(No Model.)
F. H. RICHARDS.
GEAR CUTTING MACHINE.
No. 305,234. Patented Sept. 16, 1884.
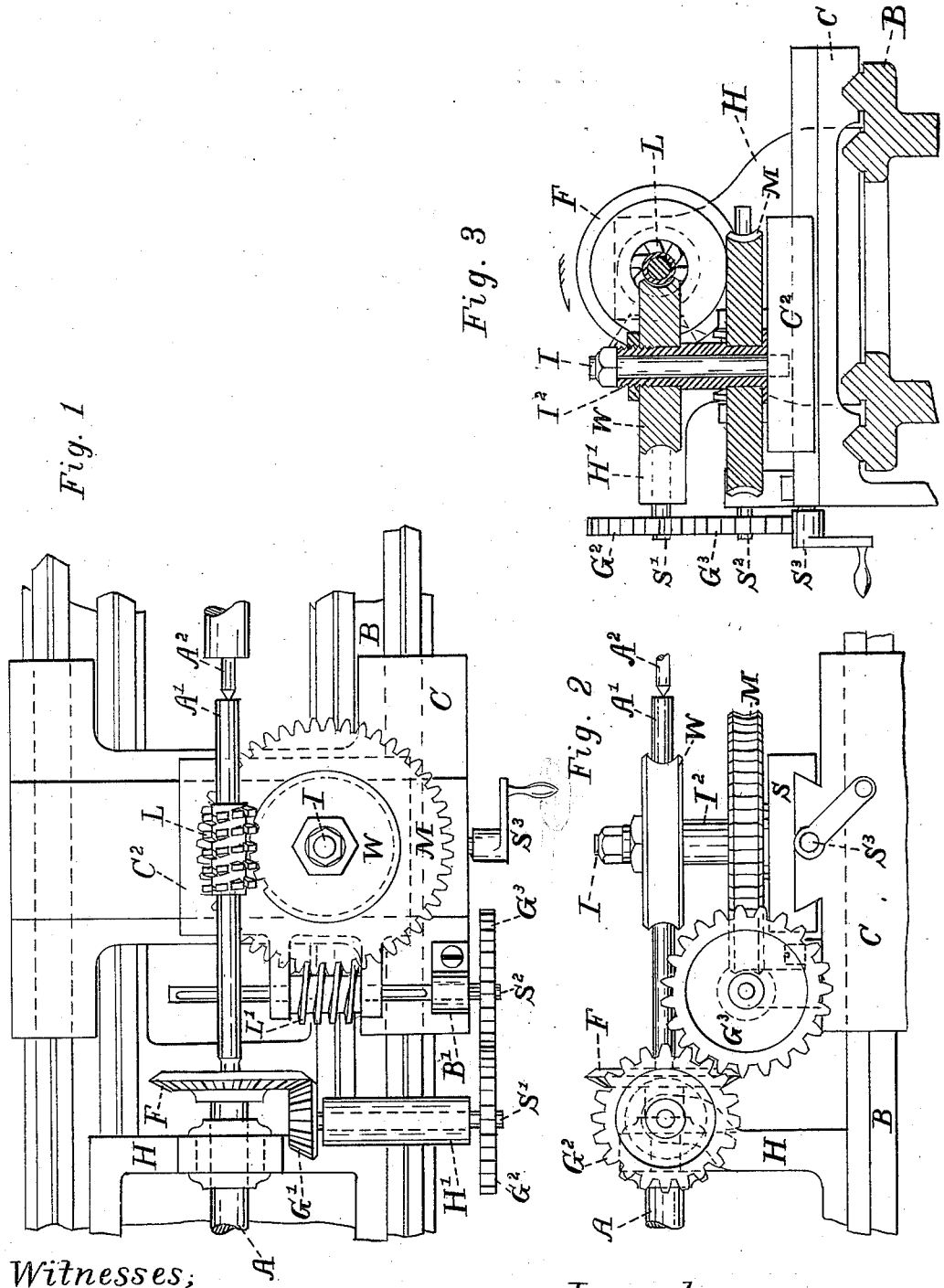
Witnesses:
H. W. Faulkner
Chas. O. Palmer
Inventor:
Francis H. Richards.

United States Patent Office.

FRANCIS H. RICHARDS, OF SPRINGFIELD, MASSACHUSETTS, ASSIGNOR TO THE PRATT & WHITNEY COMPANY, OF HARTFORD, CONNECTICUT.

GEAR-CUTTING MACHINE.

SPECIFICATION forming part of Letters Patent No. 305,234, dated September 16, 1884.

Application filed December 31, 1883. (No model.)

*To all whom it may concern:*

Be it known that I, FRANCIS H. RICHARDS, a citizen of the United States, residing at Springfield, in the county of Hampden and State of Massachusetts, have invented certain new and useful Improvements in Gear-Cutting Machines, of which the following is a specification, reference being had to the accompanying drawings.

This invention relates to that class of gear-cutting machines adapted for cutting worm-wheels by means of a hob, in which the blank-arbor and cutter-arbor are revolved harmoniously by means of gearing intermediate to them.

The object of my invention is to provide a machine for that purpose of the nature of an attachment to an engine-lathe, the said lathe forming, for the time, a part of the gear-cutting machine. For the attainment of that object it consists in certain mechanism, hereinafter described and illustrated in the drawings, in which—

Figure 1 is a plan view. Fig. 2 is a front elevation; and Fig. 3, an end elevation, partially in section.

Similar letters refer to similar parts throughout the several views.

It is not essential that any particular kind of lathe shall be used upon which to attach my improvements; but I prefer one having a gibbed carriage and a cross-slide gibbed to that carriage, because that kind of lathe as now usually made is better adapted to hold the blank firmly to the cutter. B is the bed of such a lathe, upon which the usual head-stock, H, and carriage C are suitably secured, the tail-stock not being shown. The live-spindle A and the dead-spindle are of the usual description. In the present instance the live center is removed from the former spindle and an arbor, A', substituted therefor, the right-hand end of that arbor being supported upon the usual dead-center, A². Upon suitable ways on carriage C any suitable slide, as C², is adapted to be traversed by any convenient means—as, for instance, the screw S³. That slide may be provided especially for and constitute a part of this attachment, which I prefer, or it may be the slide usually carrying the tool-post of the lathe. Fixed in slide C² is a stud, I, carrying a thimble, I², upon which is suitably secured the blank W to be cut, in the same manner, substantially, as heretofore practiced for the hobbing out of worm-wheels in lathes by the old method of allowing the hob to rotate the blank.

The parts thus far described are all old, and therefore I neither make any claim to nor limit myself to any particular construction of them as used in my machine.

Upon thimble I², in addition to the blank W, is rigidly secured the master-wheel M, which is preferably also a worm-wheel.

Upon one side of slide C² are formed or secured any suitable bearings, as shown best in Fig. 1, for carrying a pinion, L', that is suitably constructed to gear with the master-wheel. That pinion is driven by means of a splined shaft, S², that is supported at its front end by any suitable bearing, as B'.

Secured upon the live-spindle of the lathe, either in place of the usual face-plate, as shown in the present instance, or upon some other part of that spindle, is any suitable gear, as F, from which any suitable intermediate shaft, as S', is driven by means of a gear, as G', thereon. Any convenient bearing, as H', may be employed for supporting that intermediate shaft. Rotary motion is transmitted from shaft S' to shaft S² by means of any convenient gearing, as G² and G³, which is made of a proportion determined by the proportions of the other gearing of the machine and of the worm-wheel to be cut.

The machine being properly assembled, the blank and cutter are fixed in place and started, revolving harmoniously as stated, when the blank is fed to the cutter, as described, until sufficiently cut, that operation being essentially the same as in other machines of the same class, and readily understood without an extended description.

I do not limit myself to any particular form of gearing between the spindle and shaft S', nor between that shaft and shaft S², as it is obviously merely a matter of convenience, whether one form or another is so used.

Having thus described my invention, I claim—

1. The combination, with the carriage of an engine-lathe having a slide thereon, of stud I, master-wheel M, having a hub or thimble, $I^2$, for carrying the blank W, shaft $S^2$, having a pinion gearing with said master-wheel, and gearing between the lathe-spindle and said shaft $S^2$, substantially as described.

2. The combination, with the essential parts of an engine-lathe, of a master worm-wheel and a worm-pinion, slotted shaft $S^2$, an intermediate shaft, as $S'$, gearing from the lathe-spindle to that intermediate shaft, and gearing from that intermediate shaft to shaft $S^2$, substantially as and for the purpose described.

FRANCIS H. RICHARDS.

Witnesses:
CHAS. O. PALMER,
F. A. PRATT.